US011425717B2

(12) United States Patent
Lin et al.

(10) Patent No.: US 11,425,717 B2
(45) Date of Patent: *Aug. 23, 2022

(54) CONFIGURING AN HVAC WIRELESS COMMUNICATION DEVICE

(71) Applicant: Trane International Inc., Davidson, NC (US)

(72) Inventors: Tianxiang Lin, Arden Hills, MN (US); Joel C. VanderZee, La Crosse, WI (US)

(73) Assignee: Trane International Inc., Davidson, NC (US)

(*) Notice: Subject to any disclaimer, the term of this patent is extended or adjusted under 35 U.S.C. 154(b) by 15 days.

This patent is subject to a terminal disclaimer.

(21) Appl. No.: 17/006,216

(22) Filed: Aug. 28, 2020

(65) Prior Publication Data
US 2020/0396737 A1 Dec. 17, 2020

Related U.S. Application Data

(63) Continuation of application No. 15/871,536, filed on Jan. 15, 2018, now Pat. No. 10,772,097.

(51) Int. Cl.
H04W 72/04 (2009.01)
H04B 17/318 (2015.01)
(Continued)

(52) U.S. Cl.
CPC ...... *H04W 72/0453* (2013.01); *H04B 17/318* (2015.01); *H04B 17/382* (2015.01); *H04W 4/80* (2018.02); *H04W 72/02* (2013.01)

(58) Field of Classification Search
CPC ... H04W 72/0453; H04W 4/80; H04W 72/02; H04B 17/318; H04B 17/382; H04L 67/12; H04L 67/125
(Continued)

(56) References Cited

U.S. PATENT DOCUMENTS 6,628,639 B1 9/2003 Ishii
6,697,626 B1 2/2004 Eidson et al.
(Continued)

FOREIGN PATENT DOCUMENTS

EP 2654363 6/2017

*Primary Examiner* — Kwang B Yao
*Assistant Examiner* — Syed M Bokhari
(74) *Attorney, Agent, or Firm* — Womble Bond Dickinson (US) LLP

(57) ABSTRACT

Configuration of a communication module based on determination of an idle time metric is described. In one embodiment, signal strength data representative of composite signal strength indicators of a group of frequency channels utilized by the communication module is determined. A composite indicator of the composite signal strength indicators can be employed that comprises multiple signal strength indicators, sampled over time, of a first channel of the group of frequency channels. Respective values for the composite indicator can be assigned in response to comparisons of the multiple signal strength indicators to one or more defined threshold(s). An idle time metric of the first channel can be determined based on a combination of the respective values and a best channel from among the group of frequency channels can be determined based on the idle time metric. The communication module can be updated to communicate via the best channel.

16 Claims, 11 Drawing Sheets

(51) Int. Cl.
 *H04B 17/382* (2015.01)
 *H04W 4/80* (2018.01)
 *H04W 72/02* (2009.01)

(58) Field of Classification Search
 USPC .......................................................... 370/252
 See application file for complete search history.

(56) References Cited

U.S. PATENT DOCUMENTS

| | | |
|---|---|---|
| 7,406,062 B2 | 7/2008 | Hsu |
| 8,102,799 B2 | 1/2012 | Alexander et al. |
| 8,891,451 B2 | 11/2014 | Shao et al. |
| 9,363,796 B2 | 6/2016 | Noh et al. |
| 9,420,592 B2 | 8/2016 | Choi et al. |
| 9,775,164 B2 | 9/2017 | Amini et al. |
| 9,801,010 B2 | 10/2017 | Yuan et al. |
| 9,843,347 B2 | 12/2017 | Botchway et al. |
| 2007/0072554 A1 | 3/2007 | Janky |
| 2007/0156016 A1* | 7/2007 | Betesh ............... A61B 1/00055 600/102 |
| 2011/0110255 A1 | 5/2011 | Park et al. |
| 2012/0163210 A1 | 6/2012 | Yun |
| 2013/0083722 A1* | 4/2013 | Bhargava ............. H04W 88/04 370/315 |
| 2016/0105866 A1 | 4/2016 | Han |
| 2016/0330663 A1 | 11/2016 | Zhou et al. |
| 2017/0310100 A1 | 10/2017 | VanderKoy et al. |
| 2017/0374602 A1 | 12/2017 | Gokturk et al. |

\* cited by examiner

CONFIGURING AN HVAC WIRELESS COMMUNICATION DEVICE

CROSS-REFERENCE TO RELATED APPLICATION

This application is a Continuation of U.S. Utility patent application Ser. No. 15/871,536 entitled "CONFIGURING AN HVAC WIRELESS COMMUNICATION DEVICE" and filed Jan. 15, 2018, now U.S. Pat. No. 10,772,097, the entirety of which is hereby incorporated by reference herein for all purposes.

TECHNICAL FIELD

The present disclosure is directed to systems, apparatus, and methods for configuring a wireless communication device of a heating, ventilation, and air conditioning (HVAC) system, and in particular, configuring channel selection with regard to the wireless communication device.

BACKGROUND

Heating, ventilation, and air conditioning (HVAC) systems can utilize a communication component or module to provide wireless communication for the HVAC system. Such can allow remote monitoring or control of the HVAC system or allow access to tools or services provided by the HVAC system. Many HVAC systems communicate according to a ZigBee® communication protocol.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a system can comprise a memory that stores computer executable components and a processor that executes computer executable components stored in the memory. The computer executable components can comprise an energy scanning component configured to determine signal strength data. The signal strength data can be representative of composite signal strength indicators of a group of frequency channels utilized by a communication module. A composite indicator of the composite signal strength indicators can comprise multiple signal strength indicators, sampled over time, of a first channel of the group of frequency channels. The computer executable components can comprise an evaluation component configured to assign respective values for the composite indicator in response to comparisons of the multiple signal strength indicators to a defined threshold. The evaluation component can be configured to determine an idle time metric of the first channel based on a combination of the respective values. The evaluation component can be configured to determine the first channel is a best channel from among the group of frequency channels based on the idle time metric. The computer executable components can further comprise configuration component configured to update the communication module to communicate via the best channel.

In some embodiments, elements described in connection with the system can be embodied in different forms such as a computer-implemented method, a computer program product, or another form.

DETAILED DESCRIPTION

Overview

Figure 1:
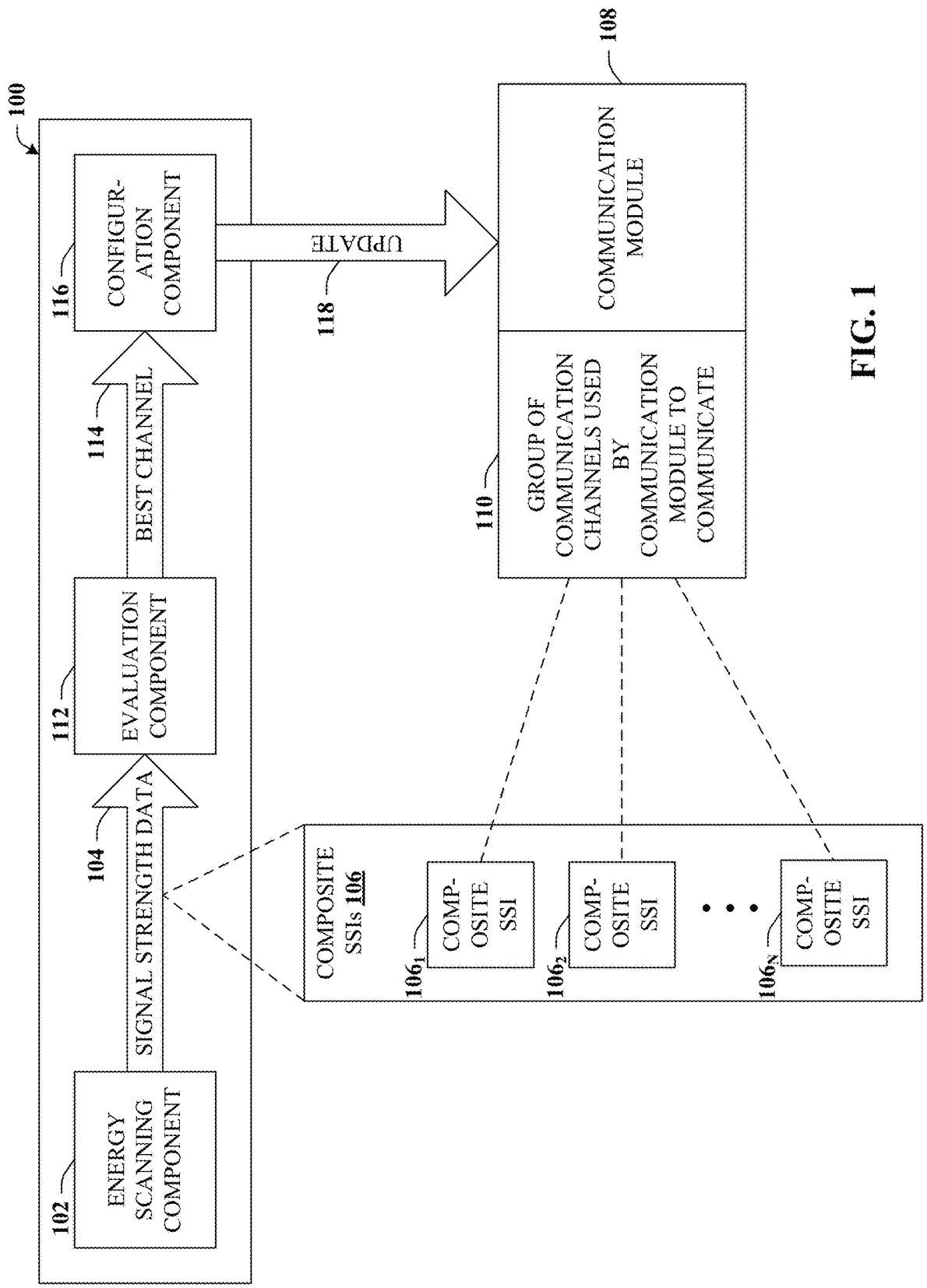
FIG. 1 illustrates a block diagram of an example, non-limiting system that can determine a preferred RF channel based on an idle time metric and can configure a communication module to utilize the preferred RF channel in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Some heating, ventilation, and air conditioning (HVAC) systems include a communication module to enable the HVAC system to communicate with other devices according to a wireless radio frequency (RF) protocol. Many such communication modules operate according to a ZigBee® communication protocol. The ZigBee® protocol features a low power, low bandwidth network that is ideal for home automation and building control. However, ZigBee® protocols operate in the same RF ranges as many other wireless protocols such as Bluetooth® protocols, wireless fidelity (WiFi) protocols, and others that are commonly used in environments where the HVAC system is located. Hence, it can be advantageous to identify interference characteristics of a robust wireless environment, e.g., to properly configure and troubleshoot the communication device of the HVAC system.

For example, HVAC systems that communicate via Zig-Bee® protocols can experience communication loss as a result of sustained interference with other protocols operating at the same or similar RF frequency. Interference can also stem from cordless/wireless phones, microwave ovens, etc., all of which can limit the HVAC system's ability to communicate. A communication loss for the HVAC system can trigger alarms and mislead a customer or other operator to believe the HVAC system is malfunctioning, which can directly impact customer satisfaction, user experiences, brand goodwill, and, ultimately, commercial success.

The disclosed subject matter, in some embodiments, is directed to effectively characterizing an extant RF environment according to various techniques detailed herein, e.g., to identify a preferred or best RF channel that can mitigate interference and/or communication loss. In some embodiments, the disclosed subject matter can thus provide an unconventional technological improvement (e.g., disclosed techniques to mitigate interference and/or communication loss) to a technological problem (e.g., conventional HVAC systems being situated in RF-saturated environments). Similarly, the disclosed subject matter, in some embodiments, can improve the manner in which HVAC systems communicate or other improvements to technological fields.

In that regard, a measure of RF interference can be identified. In some embodiments, the measure of RF interference can represent the RF signal of other devices competing for the same or similar RF spectrum. Hence, the RF interference can be characterized by associated signal strength and associated time span within a specific RF frequency range. The lower the signal strength and/or the less sustained the time of utilization of a particular RF channel by the competing devices, the more available that RF channel is for the communication module of the HVAC system, and the lower the probability of triggering communication loss.

In some embodiments, the disclosed techniques can estimate an idle time metric for some or all ZigBee® (or other protocol) channels that are utilized by the communication module of the HVAC system. Such can be accomplished by, e.g., scanning the RF energy levels of those ZigBee® channels. The idle time metric for a ZigBee® channel can be defined as the time duration in which the RF interference level is sufficiently low so that communication on that channel by the HVAC system communication module is not likely to stall. For each channel, a received signal strength indicator (RSSI) or another suitable signal strength measure can be sampled. The number of samples and a duration of each sample can be implemented to meet defined characteristics determined to be sufficient for the general solution or specific implementations. In some embodiments, measured RSSI or measured RF energy level samples can then be analyzed using a weighted technique to determine the total idle time of a channel. A ZigBee® channel with higher total idle time can be considered as a channel with less interference and more suitable for use by the communication module of the HVAC system.

In some embodiments, a preferred or best channel can be identified by selecting the channel with the best idle time metric. Upon identification of the best channel, the communication module can be configured to utilize that channel for communication.

Example Systems

Referring now to the drawings, FIG. 1 illustrates a block diagram of an example, non-limiting system 100. System 100 can determine a preferred RF channel based on an idle time metric and can configure a communication module to utilize the preferred RF channel in accordance with one or more embodiments of the disclosed subject matter. System 100 can comprise a processor and a memory that stores executable instructions that, when executed by the processor, facilitate performance of operations. Examples of said processor and memory, as well as other suitable computer or computing-based elements, can be found with reference to FIG. 10, and can be used in connection with implementing one or more of the systems or components shown and described in connection with FIG. 1 or other figures disclosed herein.

In this example, system 100 can include energy scanning component 102. Energy scanning component 102 can be configured to determine signal strength data 104. Signal strength data 104 can be representative of composite signal strength indicators (SSIs) 106. Composite SSIs 106 can represent a group or set of individual composite SSIs $106_1$-$106_N$, where N can be substantially any positive integer. It should be understood that composite SSI(s) $106_1$-$106_N$ can be referred to herein, either collectively or individually as composite SSI(s) 106, with appropriate subscripts employed generally only when necessary or convenient to highlight various distinctions or to better impart the disclosed concepts. Each of the respective composite SSIs 106 can represent a distinct composite indicator for each specific RF channel that is among a group 110 of communication channels used by communication module 108. In some embodiments, every RF channel that is used by communication module can be included in group 110 and composite SSIs 106 can include an individual composite SSI 106 for each member of group 110. In other embodiments, group 110 can represent a subset of all the RF channels communication module is capable of utilizing for communication. In some embodiments, communication module 108 can be a device that facilitates communication for an HVAC device or system. In some embodiments, communication module 108 can communicate according to a ZigBee® protocol.

Substantially all or any one of the composite SSIs $106_1$-$106_N$ can individually comprise multiple SSIs, which is further detailed in connection with FIG. 2. It is understood that FIG. 1 is intended to be reviewed in combination with other figures included herein for a better understanding of the disclosed subject matter.

Figure 2:
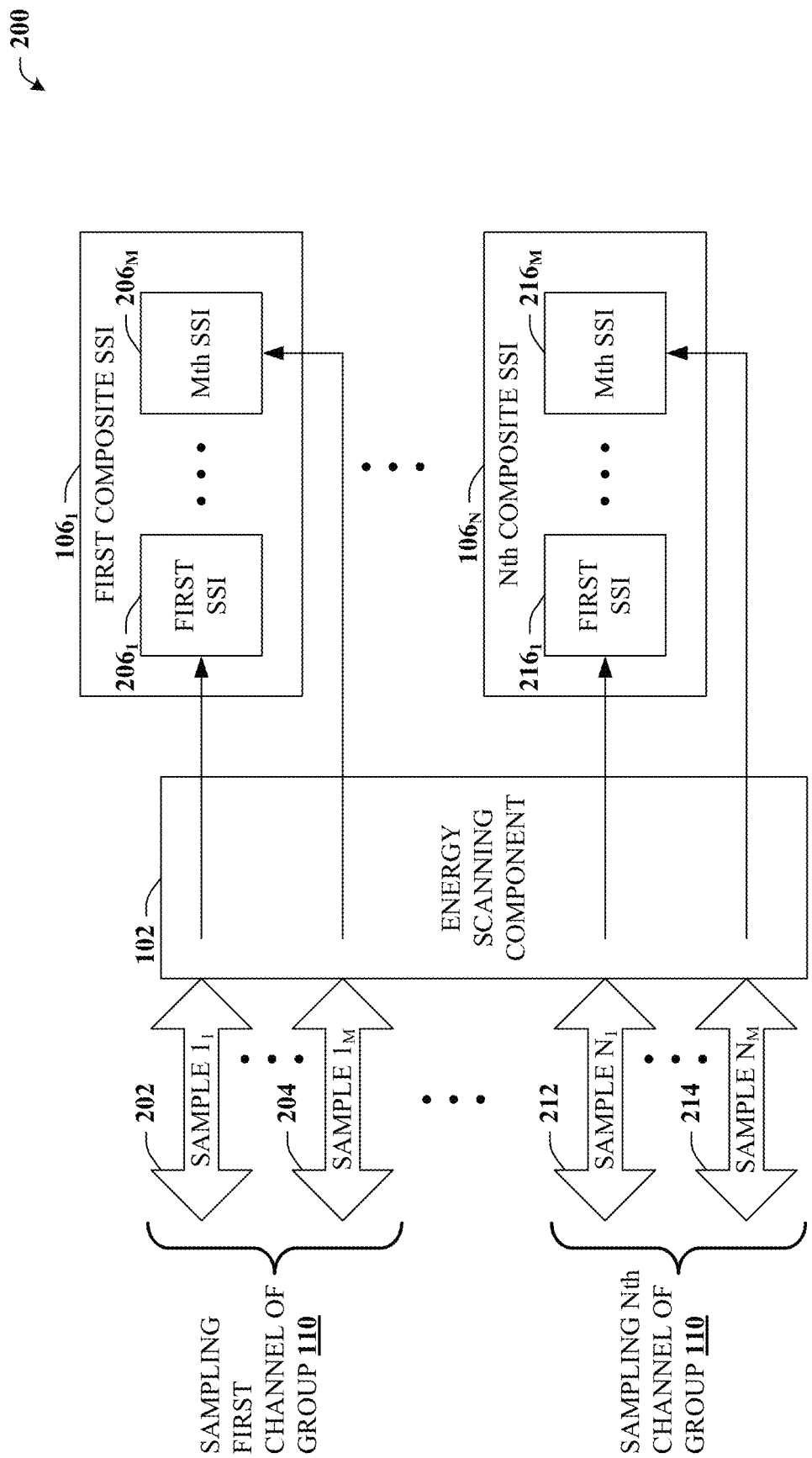
FIG. 2 illustrates a block diagram of an example, non-limiting system that illustrates additional aspects or elements in connection with energy scanning component in accordance with one or more embodiments of the disclosed subject matter.

While still referring to FIG. 1, but turning now as well to FIG. 2, a block diagram of system 200 is depicted. System 200 illustrates additional aspects or elements in connection with energy scanning component in accordance with one or more embodiments of the disclosed subject matter. It should be understood that in the discussion of the present embodiment and of embodiments to follow, repetitive description of like elements employed in the various embodiments described herein is omitted for sake of brevity.

As detailed in connection with FIG. 1, energy scanning component 102 can determine signal strength data 104, which can comprise various composite SSIs 106. Each composite SSI 106 can be representative of a distinct RF channel used by communication module 108. Hence, in order to determine a given composite SSI, energy scanning component 102 can perform some number, M, energy sampling procedures, where M can be substantially any positive integer. The energy sampling procedures can be employed to measure RSSI or substantially any suitable energy metric, parameter, or measurement. As illustrated, sample 202 can represent a first sampling of a first channel of group 110 and sample 204 can represent Mth sampling of the first channel of group 110.

Energy scanning component 102 can perform additional sampling on other channels in group 110. For instance similar sampling is depicted for the Nth channel of group 110, depicted by reference numerals 212 and 214. Substantially all or some portion of the samples of the first channel of group 110 (e.g., 202, 204) can represent individual SSIs $206_1$-$206_M$, and the collection of those multiple SSIs 206 can be representative of first composite SSI $106_1$. Likewise, substantially all or some portion of the samples of the Nth channel of group 110 (e.g., 212, 214) can represent individual SSIs $216_1$-$216_M$, and the collection of those multiple SSIs 216 can be representative of Nth composite SSI $106_N$.

In some embodiments, energy scanning component 102 can determine a first signal strength indicator (e.g., first SSI $206_1$) in response to sampling the first channel of group 110 for a duration that is sufficient to realistically gauge the idle time for that channel. In some embodiments, the duration can be determined a priori to be suitable for the application in general or for a specific implementation. In some embodiments, the duration can be at least 30 milliseconds such as about 31 milliseconds to about 35 milliseconds, but other durations are contemplated to be suitable.

In some embodiments, the number of energy samples taken (e.g., M) for a given channel of group 110 can be sufficient to accurately forecast that channel's use by other devices and/or availability to communication module 108. In some embodiments, the number of energy samples taken (e.g., M) can be thirty or more. These samples can be measured over time and can be performed at the same or different times of day.

Figure 3:
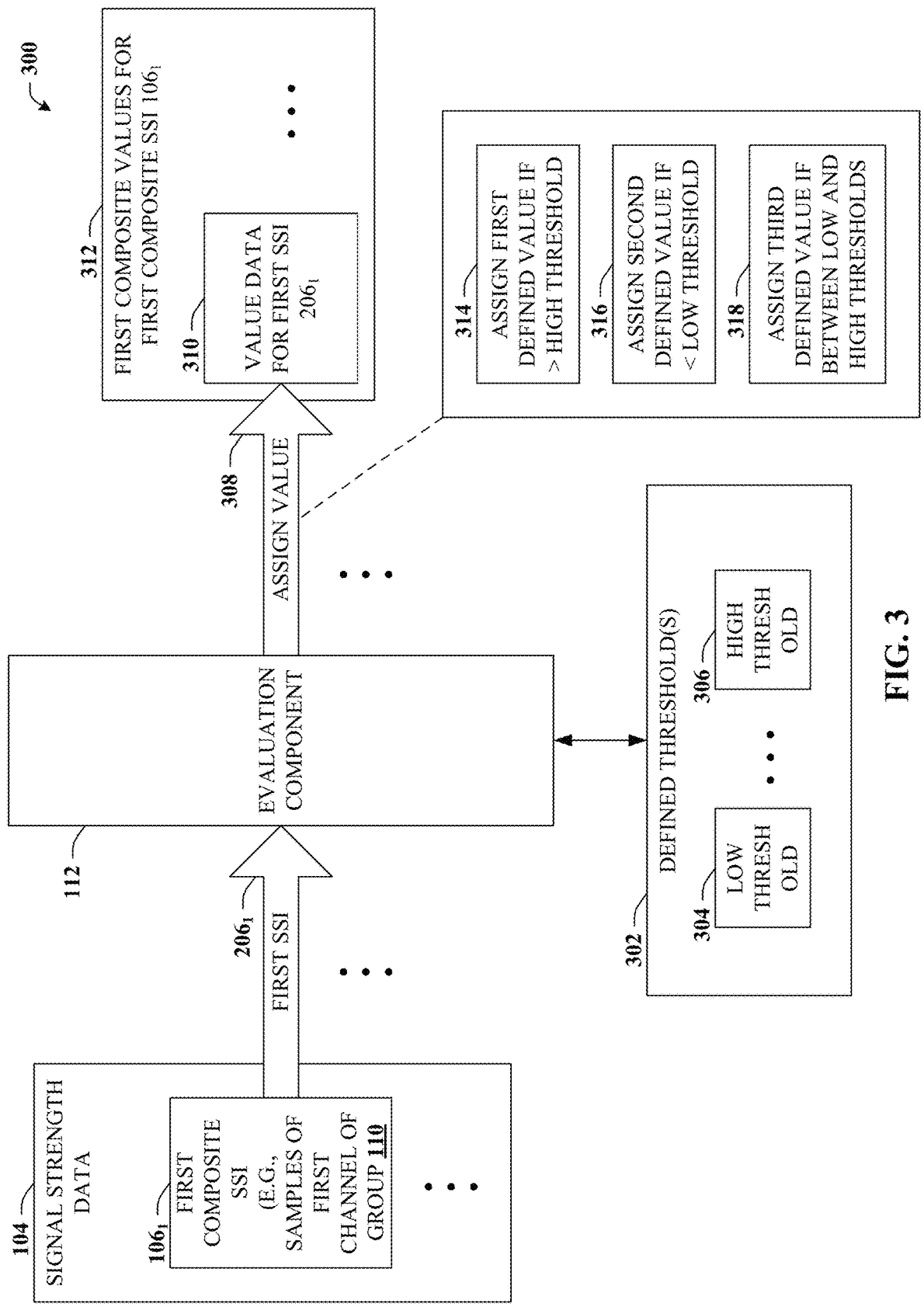
FIG. 3 illustrates a block diagram of an example system illustrating additional aspects or elements in connection with the evaluation component in accordance with one or more embodiments of the disclosed subject matter.

While still referring to FIG. 1, but turning now as well to FIG. 3, a block diagram of system 300 is depicted. System 300 illustrates additional aspects or elements in connection with the evaluation component in accordance with one or more embodiments of the disclosed subject matter.

As noted in connection with FIG. 1, evaluation component 112 can assign respective values for the composite indicator in response to comparisons of multiple signal strength indicators to one or more defined threshold(s) 302. In this example, defined threshold(s) 302 comprises at least two thresholds characterized as low threshold 304 and high threshold 306. It is understood that more or fewer thresholds can be employed.

Signal strength data 104 (e.g., provided by energy sampling component 102) can comprise first composite SSI $106_1$, which, as a composite indicator, can comprise multiple samples of a first channel of group 110. All or some portion of those multiple samples, in this case first SSI $206_1$, can be assigned a value, as indicated at reference numeral 308. For example, the value assigned can be assigned to a data structure illustrated as value data 310. Value data 310 can represent the value assigned to first SSI $206_1$. Likewise, the values assigned to each of the multiple samples of first composite SSI $106_1$ can be stored to a corresponding data structure indicated as first composite values 312, and so on for other composite SSIs 106

Evaluation component 112 can determine what value to assign to a particular value data structure (in this case value data 310) based on a comparison of the associated SSI (in this case first SSI $206_1$) to defined thresholds 302, which is further detailed in connection with reference numerals 314-318. For example, if first SSI $206_1$ is greater than high threshold 306, then a first value can be assigned to value data 310. Alternatively, if first SSI $206_1$ is less than low threshold 304, then a second value, different than the first value, can be assigned to value data 310. Otherwise, if first SSI $206_1$ is between low threshold 304 and high threshold 306, then a third value can be assigned to value data 310.

In some embodiments, the value assigned at reference numeral 308 can be determined in advance, at least in cases that satisfy reference numerals 314 and 316. In some embodiments, the value assigned at reference numeral 308 can be based on a function of the SSI (e.g., SSIs 206, 216, etc). For example, in some embodiments, the value assigned at reference numeral 308 can be a linear function of the SSI relative to one or more defined threshold(s) 302. A concrete, though non-limiting example is provided at FIG. 4.

Figure 4:
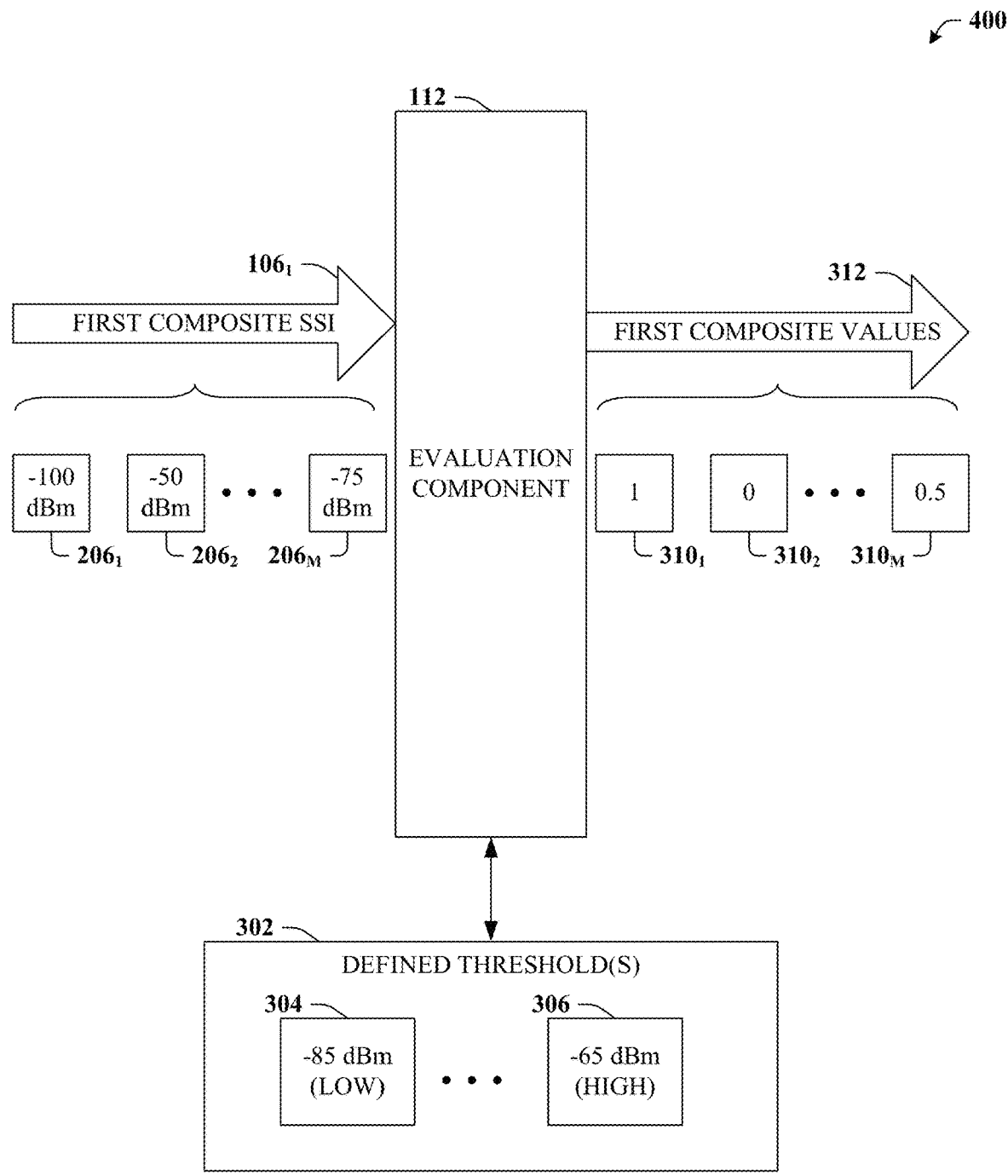
FIG. 4 illustrates a block diagram of an example system providing a concrete example of value assignment based on thresholds in accordance with one or more embodiments of the disclosed subject matter.

With reference now to FIG. 4, a block diagram of system 400 is depicted. System 400 illustrates a concrete example of value assignment based on thresholds in accordance with one or more embodiments of the disclosed subject matter.

In this example, first composite SSI $106_1$ comprises multiple individual SSIs having specified example signal strength indicators (e.g., $206_1$-$206_M$) and first composite values 312 has corresponding data structures to store the assigned values (e.g., $310_1$-$310_M$) that are respectively assigned based on comparisons to defined threshold(s) 302. In this case, low threshold 304 has a value of −85 dBm and high threshold 306 has a value of −65 dBm.

The first SSI $206_1$ indicates a measurement of −100 dBm, which is less than low threshold 304. Hence, data value $310_1$ can be assigned with a value of one. It is understood that −100 dBm can indicate that use of the channel during first sample $206_1$ is quite low thereby indicating that availability for use by communication module 108 is quite good. Hence, the value assigned can be employed to more heavily weight first composite values 312, in this case by assigning a value of one. On the other hand, second SSI $206_2$ indicates a measurement of −50 dBm, which is above the high threshold 306 and indicative of poor availability for communication module 108. As such, second data value $310_2$ can be assigned a value that reflects no or very low weight to data value $310_2$ with respect to the composite values 312.

With regard to Mth SSI $206_M$, the indicated measurement is −75 dBm, which falls between high threshold 306 and low threshold 304. This indicator implies that availability of the channel for use by communication module is not optimal, but also is not especially poor or of negligible weight. Hence, evaluation component 112 can assign to the Mth data value $310_M$ a value that is weighted less than the defined value (e.g., "1") assigned when below low threshold 304, but weight more than the defined value (e.g., "0") assigned when above high threshold 306. In some embodiments, as noted, such can be based on a linear function. For example, in this case the value assigned to data value $310_M$ is (SSI−L)/(H−L) or (−75+85)/(−65+85)=0.5. Other functions or formulas are contemplated, of course, that provide the advantage of lending an appropriate weight to the sample that falls between two defined thresholds. As noted, an advantage of the above-mentioned techniques for assigning the value can be to capture threshold-based weights (e.g., contribution-limiting weights) that individually contribute to a realistic channel-availability estimate, which is further detailed in connection with the idle time metric further discussed in connection with FIG. 5.

Figure 5:
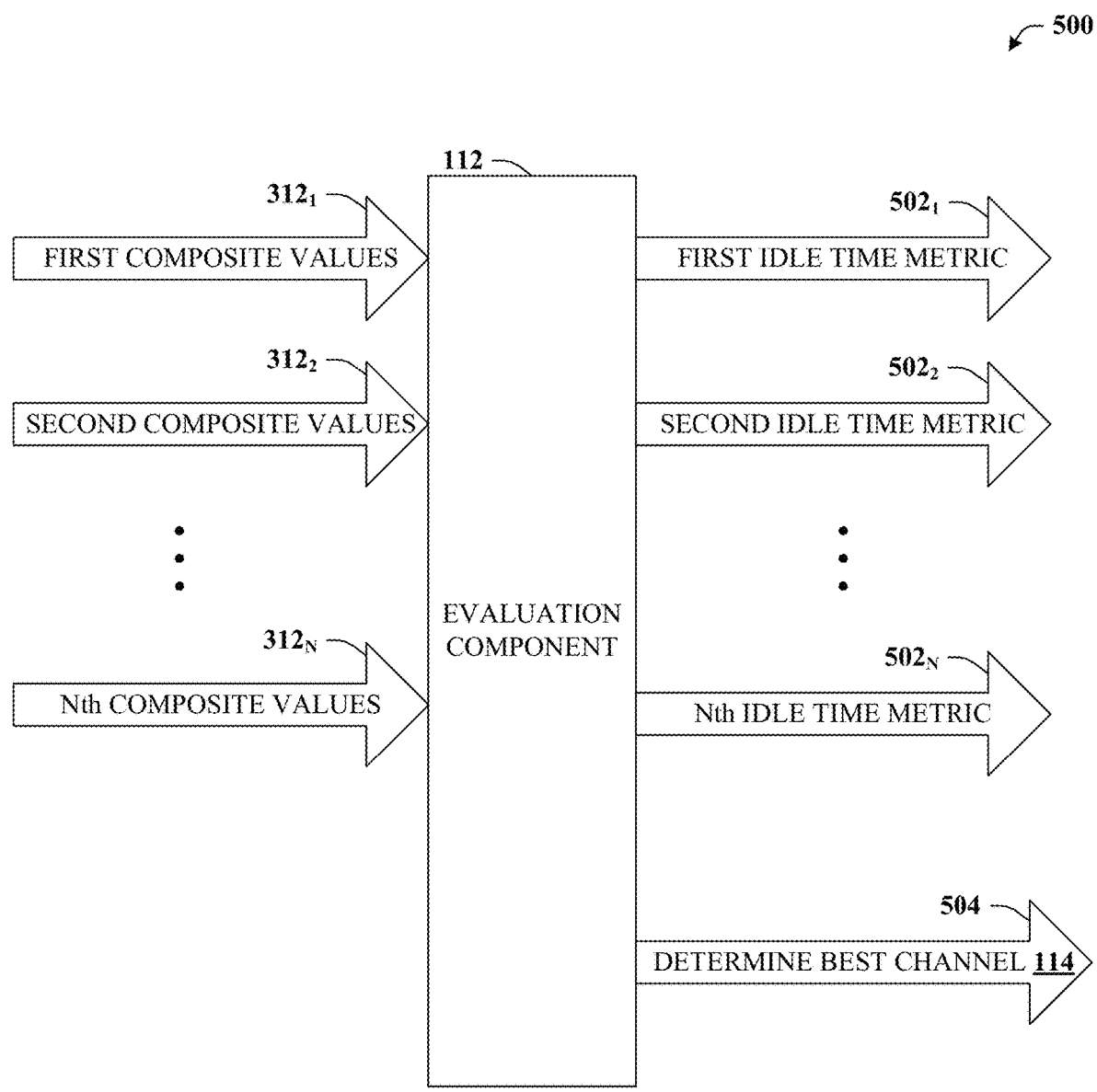
FIG. 5 illustrates a block diagram of an example system that can determine an idle time metric and a best channel based on the idle time metric in accordance with one or more embodiments of the disclosed subject matter.

With reference now to FIG. 5, a block diagram of system 500 is depicted. System 500 illustrates an example of determining an idle time metric and a best channel based on the idle time metric in accordance with one or more embodiments of the disclosed subject matter.

For example, evaluation component 112 can determine first composite value data $312_1$ as detailed above, or in any other suitable manner. It is noted that first composite values $312_1$ can represent a composite data structure of multiple SSI samples take for a first channel of group 110. Hence, evaluation component 112 can, in a similar way, determine similar composite values representative of other channels of group 110, such as second composite values $312_2$ and Nth composite values $312_N$. For any one of the composite values (e.g., $312_1$, $312_2$, $312_N$ . . . ) a corresponding idle time metric 502 can be determined such as first idle time metric $502_1$, second idle time metric $502_2$, Nth idle time metric $502_N$, and so on. Evaluation component 112 can thus determine a distinct idle time metric 502 for all or a portion of each of the channels of group 110 that are utilized by communication module 108.

In some embodiments, evaluation component 112 can determine a particular idle time metric 502 as a sum of the respective values (e.g., data values $310_1$-$310_M$) that were previously assigned to corresponding SSI samples (e.g., $206_1$-$206_M$). Other combinations, apart from a straight sum, are also contemplated. For example, evaluation component 112 can determine an idle time metric 502 based on a mean average of the respective values, a medium average of the respective values, a weighted sum or average of the respective values, and so on. Employing a weighted sum or average can, for example, more heavily weight or less heavily weight data values that correspond to samples (e.g., 202) taken during a particular time of day or in connection with a particular event.

Furthermore, evaluation component 112 can determine a best channel 114, as indicated by reference numeral 504. For instance, the 'best' channel can be the channel from among group 110 that has the highest idle time metric 502, or otherwise best or most preferred channel from among group 110. In other words, the best channel 114 can be the channel having the idle time metric 502 that indicates the best availability for communication module 108. Hence, reference numeral 504 can represent a selection of the channel having the highest (or otherwise preferred) idle time metric 502.

Figure 6A:
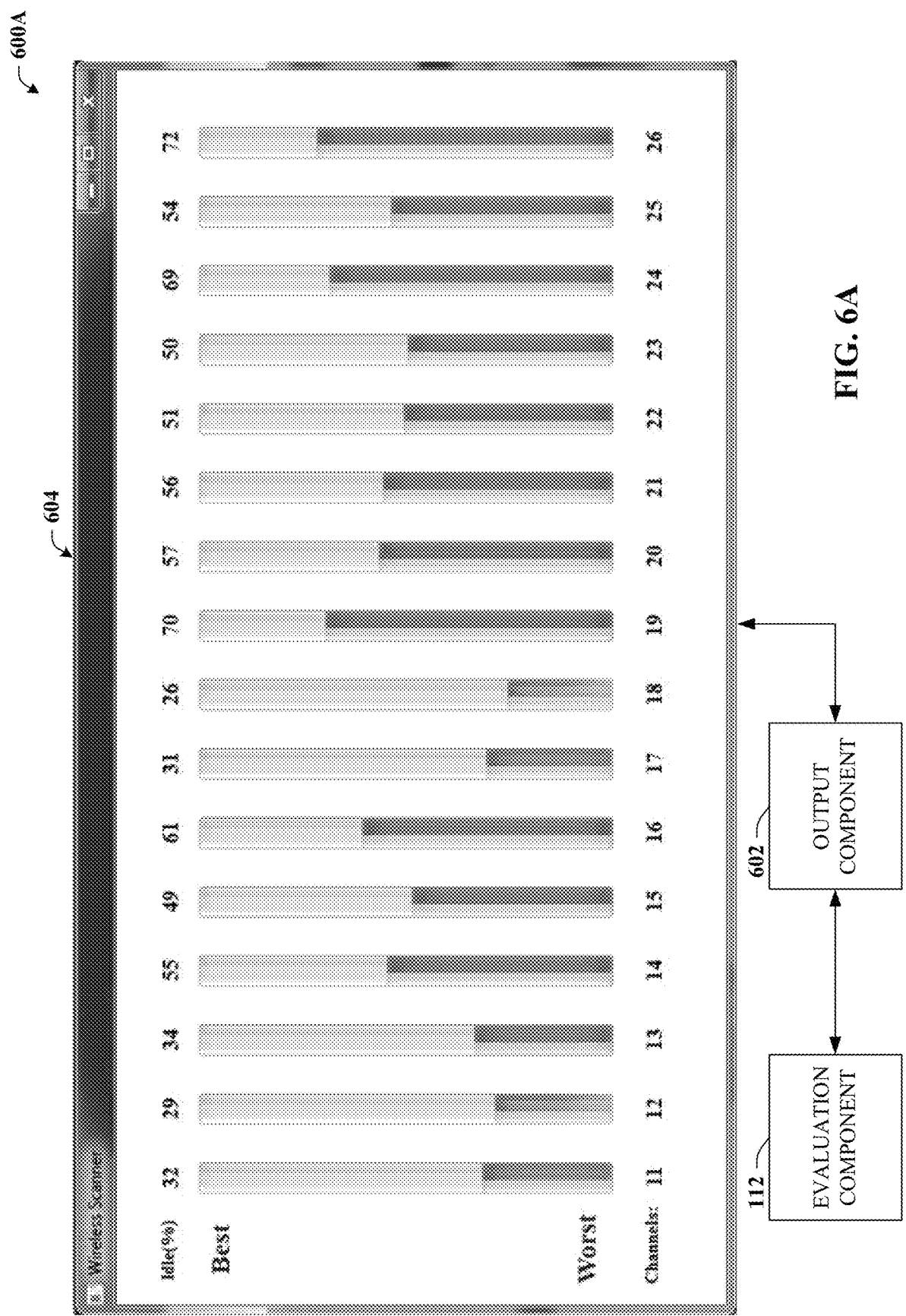
FIG. 6A illustrates a block diagram of an example system that can graphically present a representation of the idle time metric in accordance with one or more embodiments of the disclosed subject matter.

Turning now to FIG. 6A, a block diagram of system 600A is illustrated. System 600A illustrates an example of graphically presenting a representation of the idle time metric in accordance with one or more embodiments of the disclosed subject matter.

System 600A can include evaluation component 112 or, in some embodiments, all or a portion of the components detailed in connection with system 100 of FIG. 1. Furthermore, system 600A can include an output component 602 can that can present one or more idle time metric 502 or other data detailed herein. The upper portion of FIG. 6 illustrates an example graphical depiction 604. Example graphical depiction 604 provides a listing of channels at the bottom, in this case channels 11-26, which can be representative of all or a portion of the channels of group 110. For each of the illustrated channels, a corresponding "Idle (%)" is presented at the top, with a graphical illustration of that Idle (%) in the middle. In some embodiments, the Idle (%) can be representative of idle time metric 502. As indicated, channel 19, channel 24, and channel 26 have excellent values, with channel 26 likely being the best channel 114 (e.g., an Idle (%) of 72).

Figure 6B:
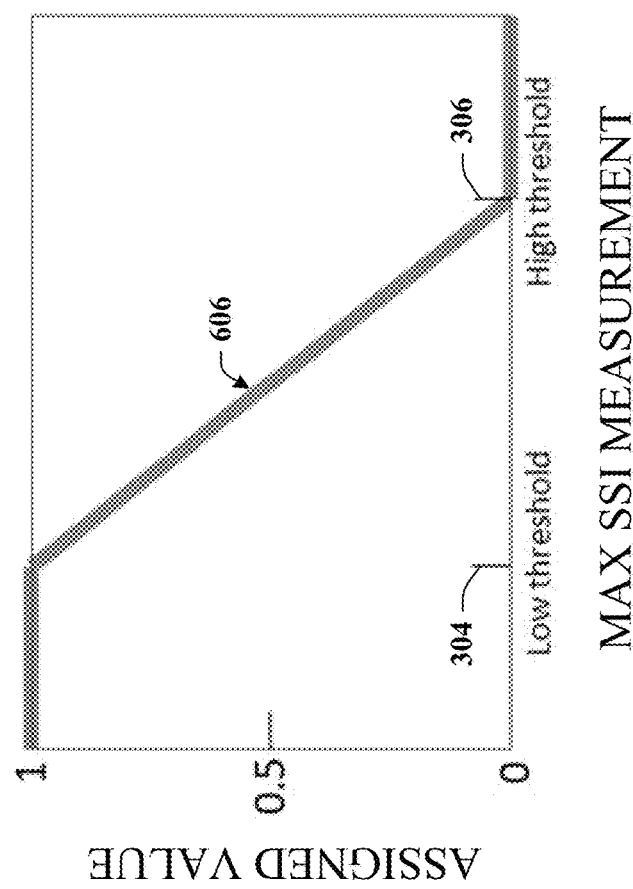
FIG. 6B illustrates a graph representative of an example linear function that can be utilized to assign a value to value data in accordance with one or more embodiments of the disclosed subject matter.

Referring now to FIG. 6B, graph 600B is illustrated. Graph 600B graphically represents an example linear function that can be utilized to assign a value to value data in accordance with one or more embodiments of the disclosed subject matter. Graph 600B depicts along the x-axis a maximum SSI measurement such as that acquired by sample 202 that is ascribed to first SSI $206_1$. The y-axis represents corresponding values that can be assigned (e.g., assign value 308 of FIG. 3) to a value data structure (e.g., value data 310 of FIG. 3). Here, the assigned value ranged from zero to one.

As illustrated, if the maximum SSI measurement is below low threshold 304, then the assigned value can be set to one, representing a maximum weight. If the maximum SSI measurement is above high threshold 306, then the assigned value can be set to zero, representing a no weight. Based on the threshold nature, assigned values and/or weights can be limited in contribution such that both a low SSI measurement and another SSI measurement that is much lower can still be assigned the same value (e.g., one) provided both are below low threshold 304. If the maximum SSI measurement is between low threshold 304 and high threshold 306, then the assigned value can be based on linear function 606.

Figure 7A:
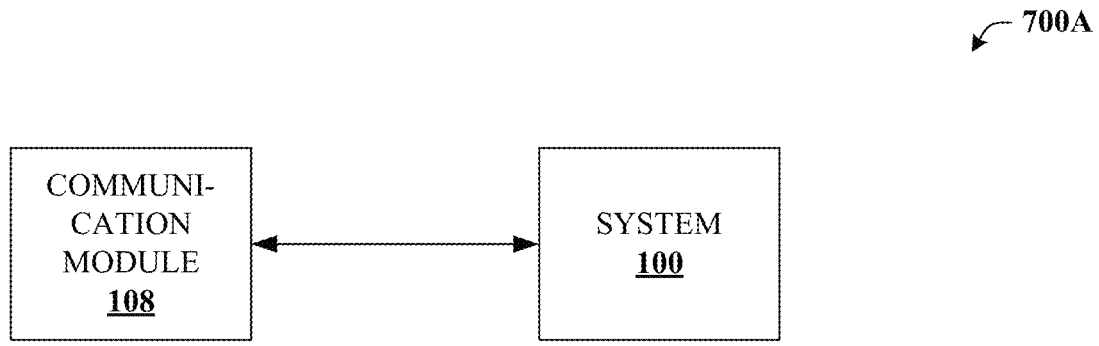
FIGS. 7A-C illustrate block diagrams of example architectural implementations that can be employed in accordance with one or more embodiments of the disclosed subject matter.
Figure 7B:
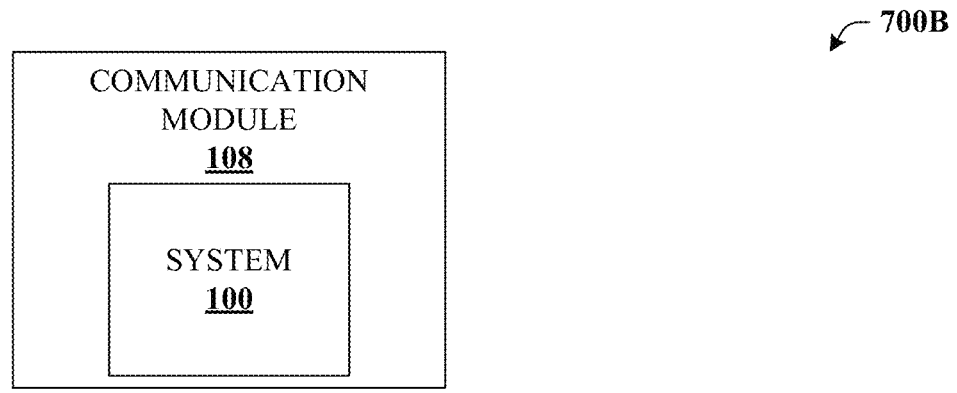
Figure 7C:
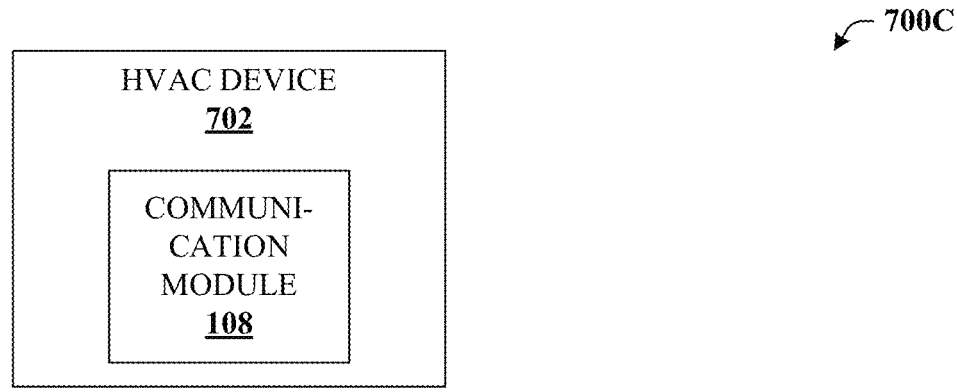

Turning now to FIGS. 7A-C, various block diagrams 700A-C of example architectural implementations are illustrated in accordance with one or more embodiments of the disclosed subject matter.

For example, block diagram 700A depicts an example architectural design in which all or portions of system 100 (or other components detailed herein) are remote from communication module 108. For example, all or portions of system 100 can be implemented on a computing device (e.g., PC, laptop, tablet, phone, etc.) that is remote from communication module 108. Additionally or alternatively, block diagram 700B depicts an example architectural design in which all or portions of system 100 (or other components detailed herein) are include in or operatively coupled to communication module 108. Block diagram 700c depicts an example architectural design in which all or portions of communication module 108 are included in or operatively coupled to HVAC device 702.

Example Methods

Figure 8:
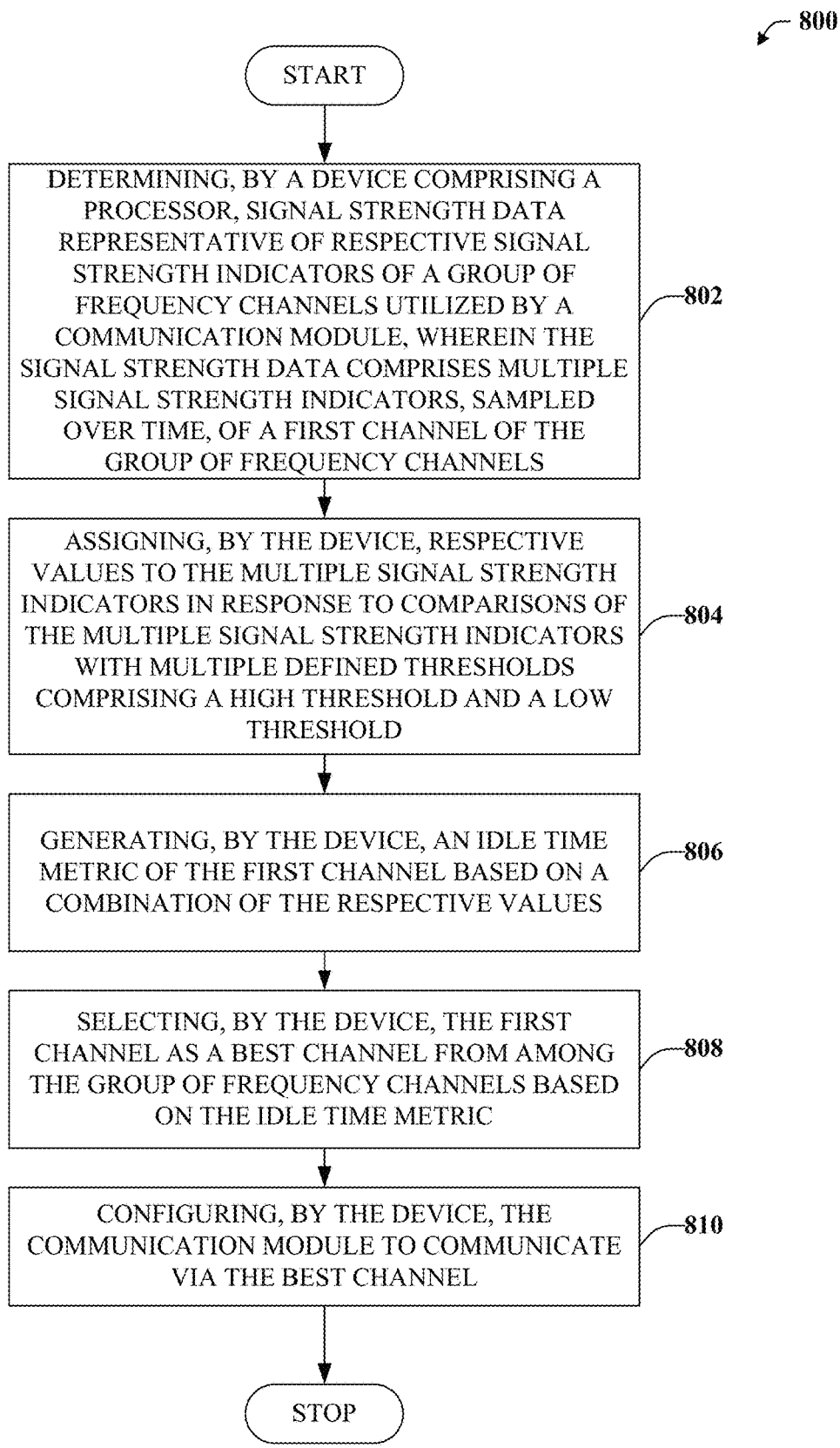
FIG. 8 illustrates a flow diagram of an example, non-limiting computer-implemented method that can determine a preferred RF channel based on an idle time metric and can configure a communication module to utilize the preferred RF channel in accordance with one or more embodiments of the disclosed subject matter.
Figure 9:
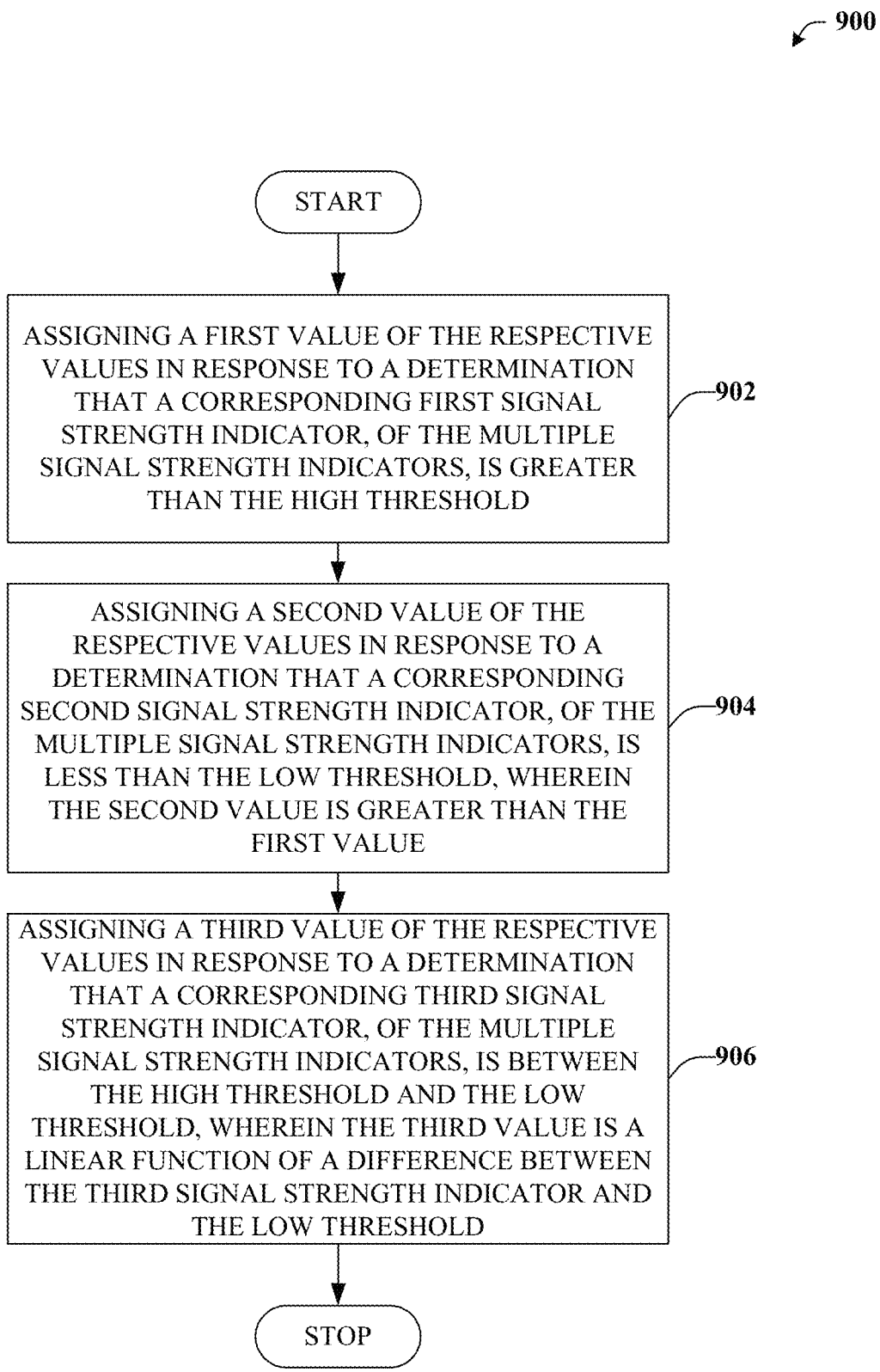
FIG. 9 illustrates a flow diagram of an example, non-limiting computer-implemented method that can provide for additional aspects or elements in connection with assigning respective values to the multiple signal strength indicators in accordance with one or more embodiments of the disclosed subject matter.

FIGS. 8 and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 8 illustrates a flow diagram 800 of an example, non-limiting computer-implemented method that can determine a preferred RF channel based on an idle time metric and can configure a communication module to utilize the preferred RF channel in accordance with one or more embodiments of the disclosed subject matter. For example, at reference numeral 802, a device (e.g., system 100) operatively coupled to a processor can determine signal strength data. The signal strength data can be representative of respective signal strength indicators of a group of frequency channels utilized by a communication module. The signal strength data can comprise multiple signal strength indicators, sampled over time, of a first channel of the group of frequency channels. In some embodiments, the communication module can provide communication services to an HVAC device.

At reference numeral 804, the device can assign respective values to the multiple signal strength indicators in response to comparisons of the multiple signal strength indicators with multiple defined thresholds comprising a high threshold and a low threshold. The high threshold can represent a signal strength threshold value that is greater than a signal strength value associated with the low threshold.

At reference numeral 806, the device can generate an idle time metric of the first channel based on a combination of the respective values. For example, multiple samples of the first channel taken over time can be combined (e.g., summed, averaged, etc.) to generate the idle time metric for the first channel. In some embodiments, other idle time metrics can be generated for other channels in a like manner.

At reference numeral 808, the device can select the first channel as a best channel from among the group of frequency channels based on the idle time metric. For example, the device can select the channel having the highest or best idle time metric.

At reference numeral 810, the device can configure the communication module to communicate via the best channel. In some embodiments, such can cause the communication module to communicate via the best channel.

Turning now to FIG. 9, illustrated is a flow diagram 900 of an example, non-limiting computer-implemented method that can provide for additional aspects or elements in connection with assigning respective values to the multiple signal strength indicators in accordance with one or more embodiments of the disclosed subject matter. For example, at reference numeral 902, the assigning the respective values (e.g., performed at reference numeral 804 of FIG. 8) can comprise assigning, by the device, a first value of the respective values in response to a determination that a corresponding first signal strength indicator, of the multiple signal strength indicators, is greater than the high threshold. The first value can be determined a priori in some embodiments such that any signal strength greater than the high threshold can be assigned the same value.

At reference numeral 904, the device can assign a second value of the respective values in response to a determination that a corresponding second signal strength indicator, of the multiple signal strength indicators, is less than the low threshold, wherein the second value is greater than the first value. The second value can be determined a priori in some embodiments such that any signal strength lower than the high threshold can be assigned the same value.

At reference numeral 906, the device can assign a third value of the respective values in response to a determination that a corresponding third signal strength indicator, of the multiple signal strength indicators, is between the high threshold and the low threshold. In some embodiments, the third value is not known a priori, even though it can be known that the third value is between the first value and the second value. In some embodiments, the third value can be a linear function of the difference between the third signal strength indicator and the low threshold.

Example Operating Environments

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
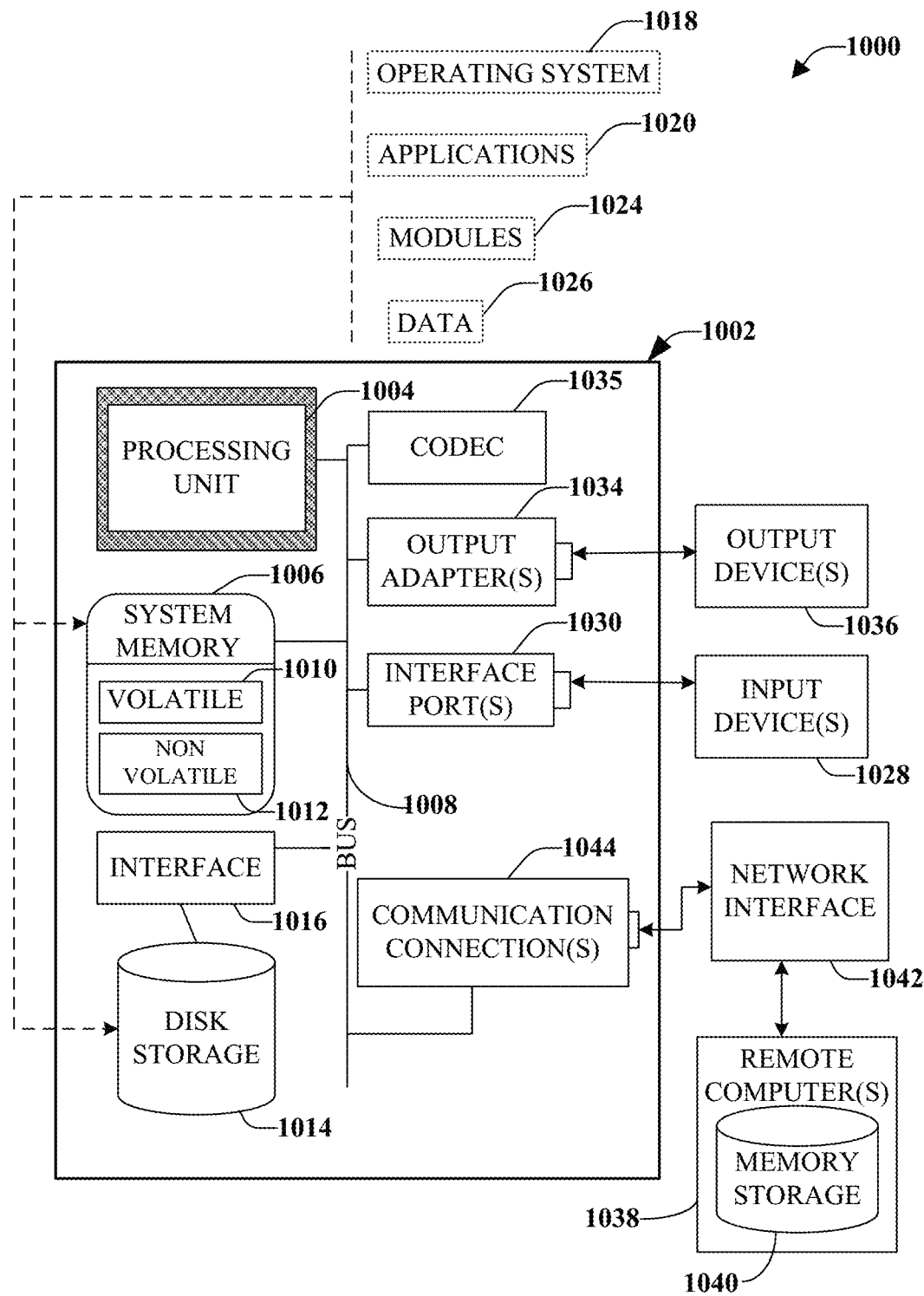
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a memory that stores computer executable components;

a processor that executes computer executable components stored in the memory, wherein the computer executable components comprise:
    an energy scanning component configured to determine signal strength data representative of composite signal strength indicators of a group of frequency channels utilized by a communication module, wherein a composite indicator of the composite signal strength indicators comprises multiple signal strength indicators, sampled over time, of a first channel of the group of frequency channels;
    an evaluation component configured to:
        assign respective values for the composite indicator in response to comparisons of the multiple signal strength indicators to a defined threshold, wherein a first respective value, of the respective values, corresponding to an indicator, of the multiple signal strength indicators, is assigned as a function of a difference between the defined threshold and the corresponding one of the multiple signal strength indicators; and
        determine an idle time metric of the first channel based on a combination of the respective values.

2. The system of claim 1, wherein the function of a difference between the defined threshold and the corresponding one of the multiple signal strength indicators is a piecewise linear function.

3. The system of claim 2, wherein the piecewise linear function, f, of a difference between the defined threshold, T, and the corresponding one of the multiple signal strength indicators, S, comprises three segments defined as $$f=1-(T-S)/W;\ 0<=(T-S)<=W$$

$$f=0;\ (T-S)<0$$

$$f=1;\ (T-S)>W$$

wherein W is a defined width of the middle segment.

4. The system of claim 1, wherein the energy scanning component determines a first signal strength indicator of the multiple signal strength indicators in response to sampling the first channel for a duration that is at least 30 milliseconds and identifying a maximum signal strength within the duration.

5. The system of claim 1, wherein the multiple signal strength indicators comprise at least thirty signal strength indicators that respectively represent at least thirty samples over time by the energy scanning component.

6. The system of claim 1, wherein the evaluation component determines the idle time metric as a sum of the respective values.

7. The system of claim 1, wherein the evaluation component determines the idle time metric as an average of the respective values.

8. The system of claim 3, wherein the defined threshold, T, is representative of −65 decibel-microvolts per meter (dBm) and the defined width of the middle segment, W, is 20 dBm.

9. The system of claim 1, wherein the communication module is a physical device that provides communication for a heating, ventilation, or air conditioning (HVAC) device.

10. A non-transitory computer-readable medium, comprising executable instructions that, when executed by a processor, facilitate performance of operations, comprising:
    receiving, by the processor, signal strength data representative of respective signal strength indicators of a range of frequency channels utilized by a communication module, wherein the signal strength data comprises multiple signal strength indicators, sampled over time, of a first channel of the range of frequency channels;
    based on a result of a comparison of the multiple signal strength indicators with a defined threshold, assigning, by the processor, respective values to the multiple signal strength indicators, wherein a first respective value, of the respective values, corresponding to an indicator, of the multiple signal strength indicators, is assigned as a function of a difference between the defined threshold and the corresponding one of the multiple signal strength indicators;
    determining, by the processor, an idle time parameter of the first channel based on an aggregation of the respective values.

11. The non-transitory computer-readable medium of claim 10, wherein the determining the idle time parameter comprises determining the idle time parameter as a sum of the respective values.

12. The non-transitory computer-readable medium of claim 10, wherein the determining the idle time parameter comprises determining the idle time parameter as an average of the respective values.

13. The non-transitory computer-readable medium of claim 10, wherein the respective values comprise a first value that corresponds to a first signal strength indicator of the multiple signal strength indicators, and wherein the operations further comprise:
    determining, by the processor, the first value of the first signal strength indicator as the piecewise linear function, f, of a difference between the defined threshold, T, and the first signal strength indicator, S, defined as $$f=1-(T-S)/W;\ 0<=(T-S)<=W$$

$$f=0;\ (T-S)<0$$

$$f=1;\ (T-S)>W$$

wherein W is a defined width of the middle segment.

14. A method, comprising:
    determining, by a device comprising a processor, signal strength data representative of respective signal strength indicators of a group of frequency channels utilized by a communication module, wherein the signal strength data comprises multiple signal strength indicators, sampled over time, of a first channel of the group of frequency channels;
    assigning, by the device, respective values to the multiple signal strength indicators in response to comparisons of the multiple signal strength indicators with multiple defined thresholds comprising a high threshold and a low threshold, wherein a respective value, of the respective values, is assigned a value that varies according to a linear function in response to a corresponding one of the multiple signal strength indicators being determined to be between the high threshold and the low threshold, wherein the linear function represents a function of a difference between the high threshold and the corresponding one of the multiple signal strength indicators;
    generating, by the device, an idle time metric of the first channel based on a combination of the respective values.

15. The method of claim 14, wherein the assigning comprises assigning a first one of the respective values to a lowest value in response to a determination that a corresponding first signal strength indicator, of the multiple signal strength indicators, is greater than the high threshold.

16. The method of claim 14, wherein the assigning comprises assigning a second one of the respective values to a maximum value in response to a determination that a corresponding second signal strength indicator, of the multiple signal strength indicators, is less than the low threshold.

* * * * *